United States Patent
Yamamoto et al.

(10) Patent No.: US 6,588,691 B2
(45) Date of Patent: Jul. 8, 2003

(54) MOBILE DOCUMENT SHREDDER WITH RETRACTABLE LOADING TUNNEL AND LOAD CELL

(75) Inventors: David Yamamoto, Paris (CA); Peter Viveen, Cambridge (CA)

(73) Assignee: Shred-Tech Inc., Cambridge (CA)

( * ) Notice: Subject to any disclaimer, the term of this patent is extended or adjusted under 35 U.S.C. 154(b) by 0 days.

(21) Appl. No.: 09/942,597

(22) Filed: Aug. 31, 2001

(65) Prior Publication Data

US 2003/0042343 A1 Mar. 6, 2003

(51) Int. Cl.[7] ............................................... B02C 21/02
(52) U.S. Cl. .................... 241/101.74; 241/101.741; 241/101.742; 241/185.5; 241/DIG. 38
(58) Field of Search ..................... 241/101.74, 101.741, 241/101.742, DIG. 38, 185.5, 186.2

(56) References Cited

U.S. PATENT DOCUMENTS

| | | | | |
|---|---|---|---|---|
| 2,961,977 A | * | 11/1960 | Coleman | 241/101.741 |
| 5,186,397 A | * | 2/1993 | Orlando | 241/23 |
| 5,226,757 A | * | 7/1993 | Tarrant | 241/101.742 |
| 5,676,320 A | * | 10/1997 | Merklinger | 241/101.741 |
| 5,720,438 A | * | 2/1998 | Devine et al. | 241/21 |
| 5,927,626 A | * | 7/1999 | Shinjo et al. | 241/101.74 |
| 5,938,132 A | * | 8/1999 | Shinjo et al. | 241/79.1 |

* cited by examiner

*Primary Examiner*—John M. Husar
(74) *Attorney, Agent, or Firm*—R. Craig Armstrong; Borden Ladner Gervais LLP

(57) ABSTRACT

A mobile shredding system is used mounted on a vehicle. The system has a hopper, for receiving material to be shredded, a shredder communicating with the hopper, and a holding space for shredded waste into which the shredder feeds shredded material. A bin lifting mechanism with at least one chain onto which a carriage is attached is mounted on a side of the vehicle. The carriage has an engagement mechanism for attaching a bin and the chain is movable by means of a drive mechanism from a lowered position, in which the carriage is adjacent the ground on which the vehicle is standing, and a raised position, in which the carriage is adjacent an inlet of the hopper and the contents of the bin are emptied into the hopper via the inlet. The carriage has a weight measuring mechanism such as a load cell incorporated therein to measure the weight of the bin when the bin is attached to the engagement mechanism. The system further has a weight indicating display, and also a electronic storage of the measured bin weight.

8 Claims, 6 Drawing Sheets

MOBILE DOCUMENT SHREDDER WITH RETRACTABLE LOADING TUNNEL AND LOAD CELL

BACKGROUND OF THE INVENTION

1. Field of the Invention

This invention relates to bulk paper and waste shredding systems. In particular the invention addresses problems associated with handling of the material during shredding operations.

2. Description of the Prior Art

Shredding systems for confidential waste material are now commonly utilized in mobile shredding facilities. The art has evolved to now require unique solutions to problems encountered in practical settings of these shredding systems while taking into account the required efficiency of the overall shredding process.

Because of the nature of the material being shredded, i.e. of confidential nature and not to be lost from the shredding bin before it is shredded, the shredding system is made mobile so the shredding operator can travel to the site of a client or similar who has confidential waste for shredding. Alternatively, the confidential waste would have to be transported to a central shredding facility, with the added risk that confidential material might accidentally be lost from the transport.

Even when a mobile shredding system is used, the confidential material inside a bin has to be lifted up and dumped into a hopper leading to a shredder. During the lifting, there is a risk that confidential material will spill from the bin, for example blown away by the wind. To safeguard against this, an enclosure has been provided, which can be pulled out from a storage position to an operating position in which the enclosure generally covers the bin on its way up to be emptied.

In general, a shredding operator bills his or her clients by weight of shredded material. Traditionally, each bin is weighed using a transportable scale before it is attached to the bin lifting mechanism and emptied into the hopper. This has the apparent drawbacks of necessitating the manipulation of the transportable scale every-time the vehicle, on which the shredding system is placed, stops for shredding, setting the scale up for weighing the bins. This increases the wear and tear on the scale, which might lead to inaccurate readings. In the extreme case, the shredding operator might forget to weigh the bins, which will lead to extra work in retroactive billing or lost income for that particular shredding operation.

Therefore, there remains a need for a shredding system to automatically or semi-automatically handle the weighing of waste material in an effective manner.

SUMMARY OF THE INVENTION

It is therefore an object of the invention to provide a confidential waste material shredding system which provides an effective weighing means for material to be shredded.

In the invention, a shredding system is used comprising a vehicle having a hopper, for receiving material to be shredded, a shredder communicating with the hopper, and a holding space for shredded waste into which the shredder feeds shredded material; and a bin lifting means having at least one chain onto which is attached a carriage, the carriage having gripping means for attaching a bin, the at least one chain being movable by means of a drive mechanism from a lowered position, in which the carriage is adjacent the ground on which the vehicle is standing, and a raised position, in which the carriage is adjacent an inlet of the hopper and the content of the bin is emptied into the hopper via the inlet. The carriage has a weight measuring means arranged to measure the weight of the bin when the bin is attached to the gripping means.

Advantageously, the weight measuring means further has a weight indicating means, for displaying the measured weight of the bin.

Preferably, the weight measuring means further has a weight value storing means, for storing the measured bin weight electronically.

The system further preferably has an enclosure arranged on a side of the vehicle, the enclosure generally covering the bin lifting means and the bin during lifting and emptying of the bin.

The enclosure is preferably a three sided enclosure which is slidably arranged in the vehicle between a stored position, in which an outer wall of the enclosure is generally flush with an outer side of the vehicle, and an operating position, in which the enclosure is pulled out from the outer side of the vehicle.

The bin lifting means advantageously comprises a hydraulic drive for powering the chain. More preferably, the hydraulic drive is a large displacement hydraulic drive. The hydraulic drive advantageously drives the chain via at least one sprocket wheel.

Preferably, the bin lifting means comprises an adjustable frame, the frame being adjustable in height to facilitate the installation of the frame relative the vehicle.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
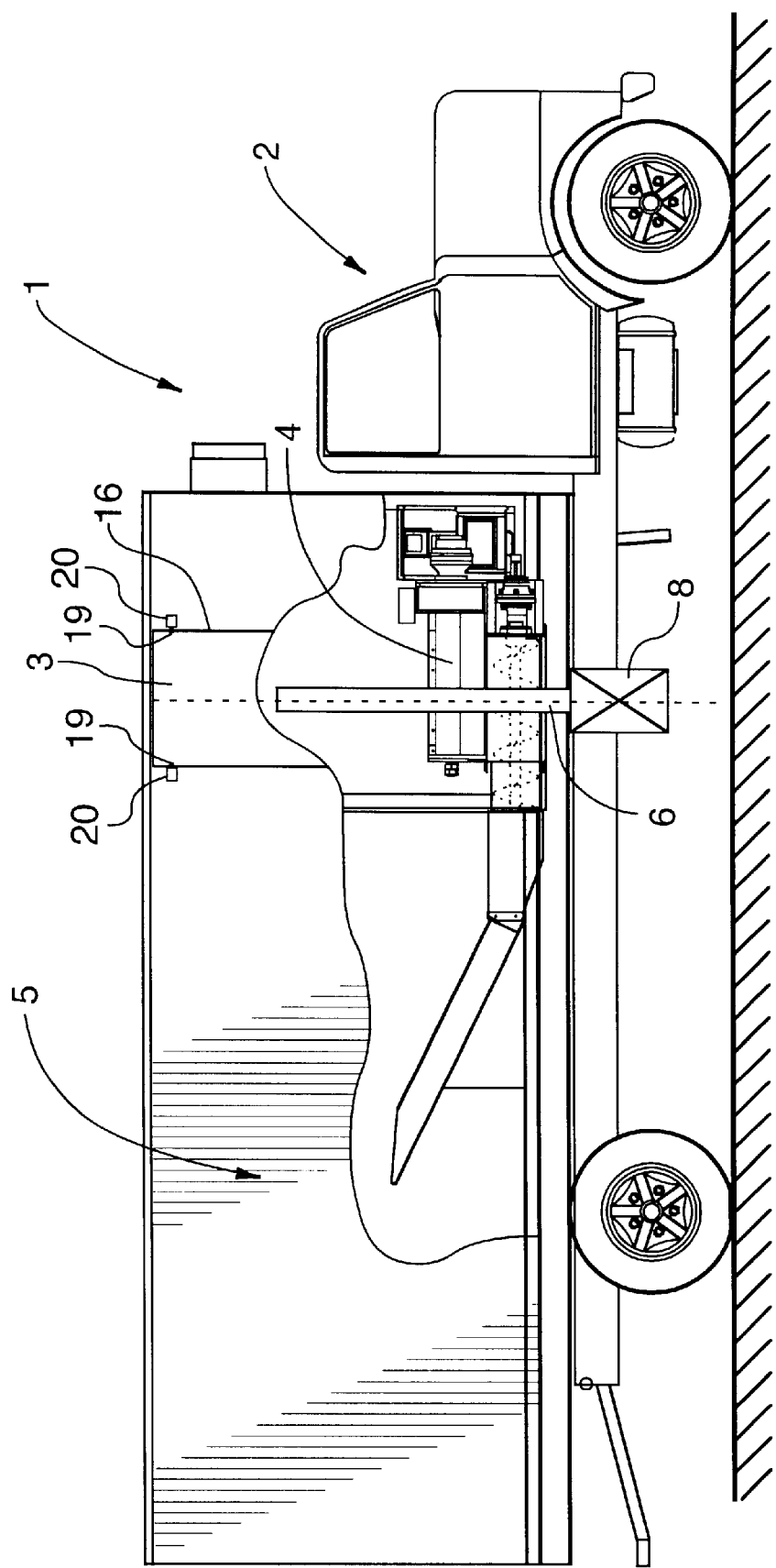
FIG. 1 is a partially sectioned side view of a mobile shredding system according to the invention.
Figure 2:
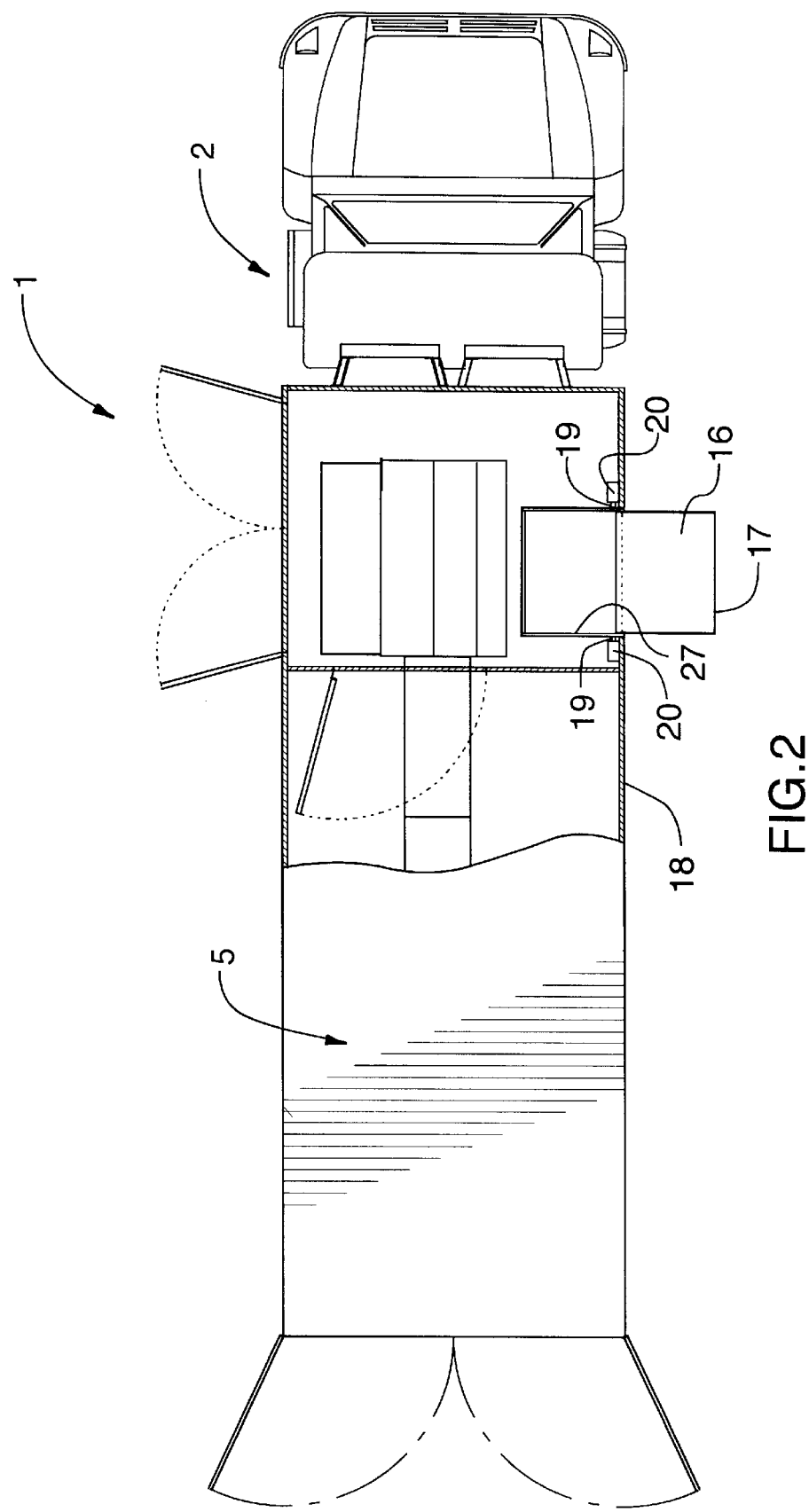
FIG. 2 is a top view of the mobile shredding system of FIG. 1.
Figure 3:
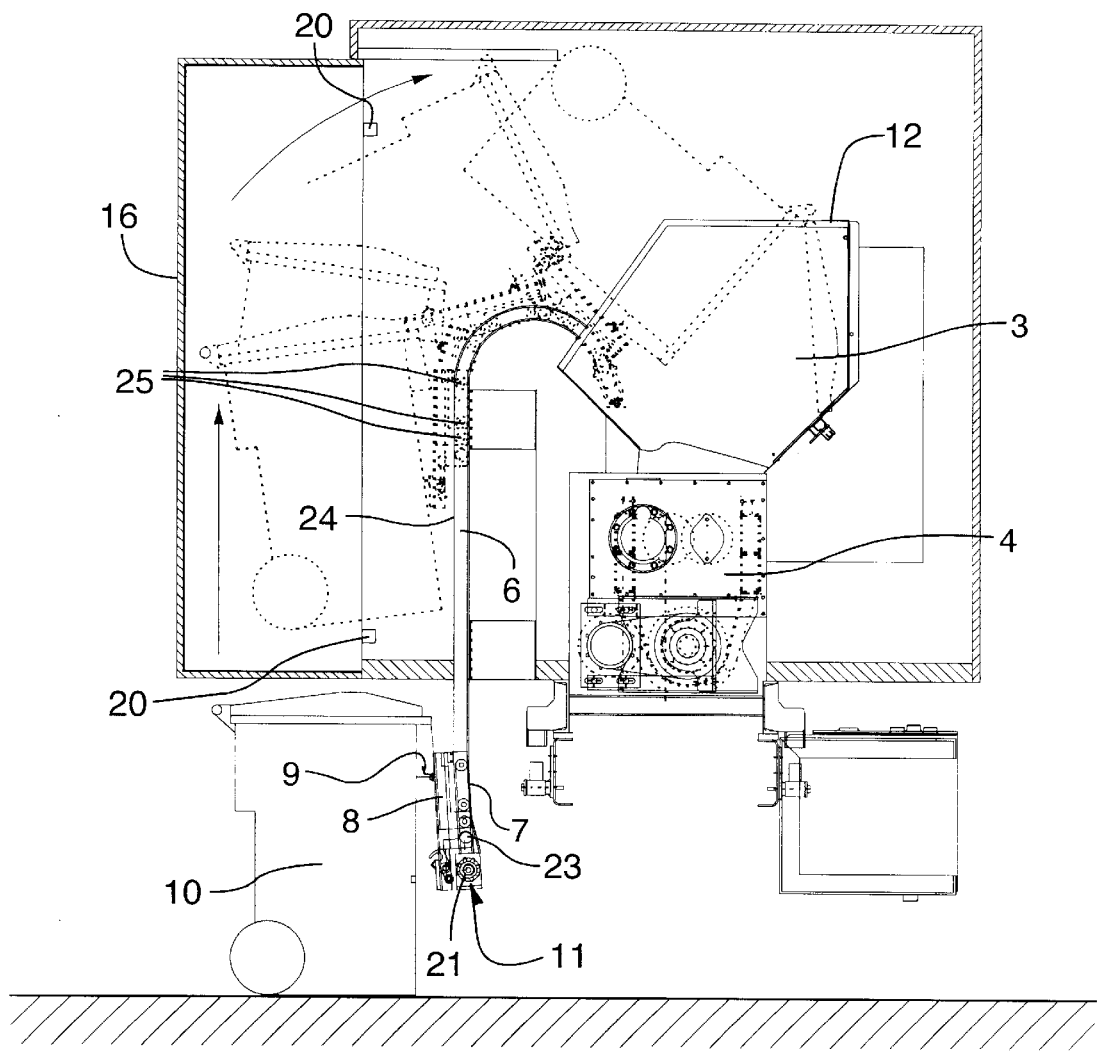
FIG. 3 is a partially sectioned end view of the mobile shredding system of FIG. 1, seen from the rear of the vehicle.
Figure 6:
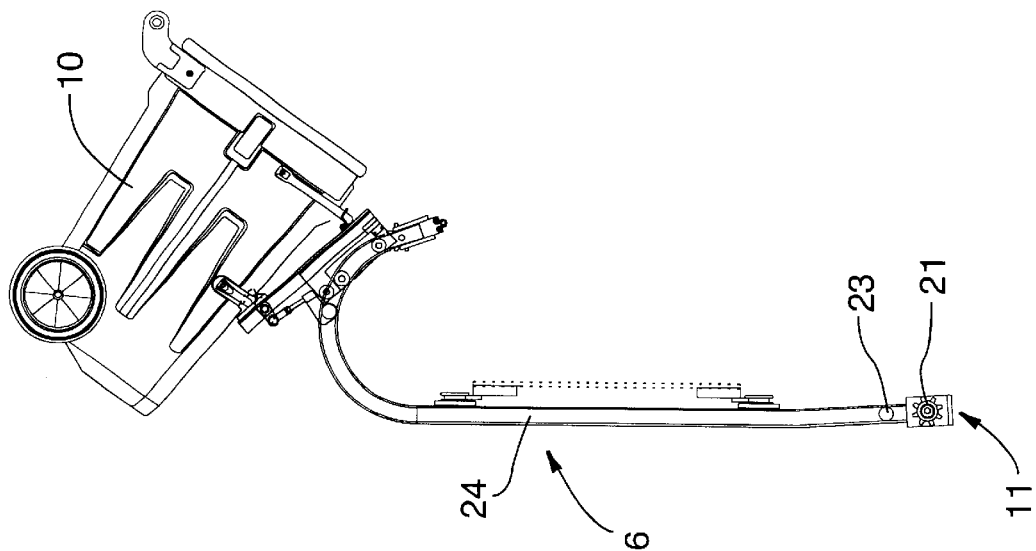
FIG. 6 is a side view of the bin lifting means of FIG. 4, showing a bin in the uppermost position, during discharge of material to be shredded from the bin.
Figure 5:
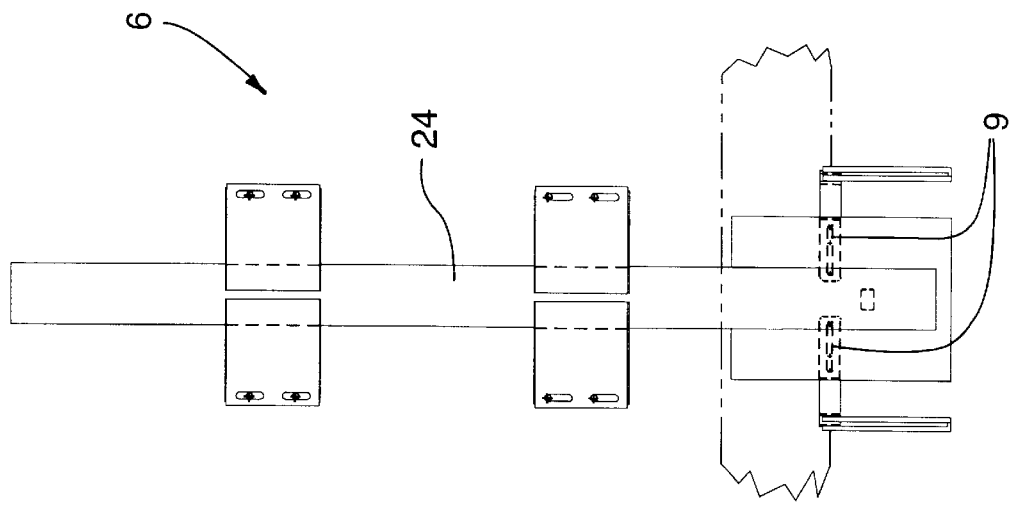
FIG. 5 is a side view of the bin lifting means of FIG. 4.
Figure 4:
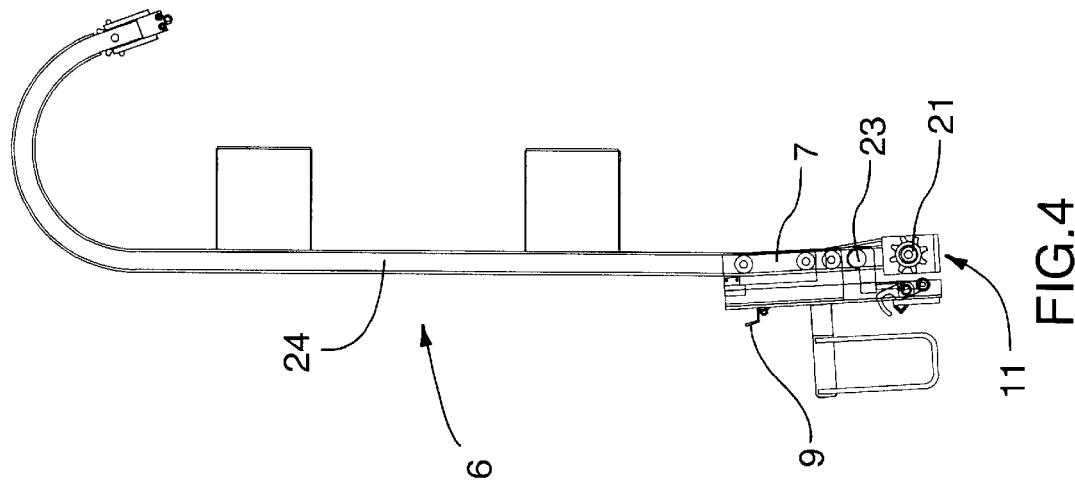
FIG. 4 is an end view of the bin lifting means of the mobile shredding system of FIG. 1.

The accompanying drawings show the preferred embodiment of the shredding system. As is shown in FIGS. 1 to 3, a shredding system 1 according to the invention has a vehicle 2 having a hopper 3, for receiving material to be shredded, a shredder 4 communicating with the hopper, and a holding space 5 for shredded waste into which the shredder feeds shredded material. The system further has a bin lifting means 6 (see FIGS. 4 to 6) having at least one chain 7 onto which is attached a carriage 8. Advantageously, a double chain construction is used. The carriage has gripping means 9 for attaching a bin 10. The chain is movable by means of a drive mechanism 11 from a lowered position, in which the carriage is adjacent the ground on which the vehicle is standing, and a raised position, in which the carriage is adjacent an inlet 12 of the hopper and the content of the bin is emptied into the hopper via the inlet. The carriage has a weight measuring means 13 arranged to measure the weight of the bin when the bin is attached to the gripping means.

Figure 8:
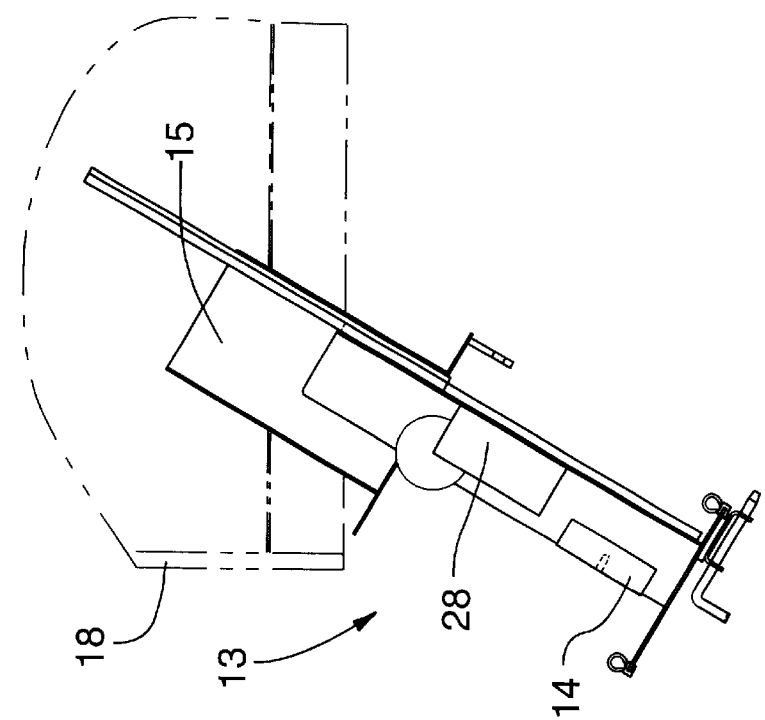
FIG. 8 is an end view of the indication means and a printer of the bin lifting means of FIG. 7, seen from line A—A.
Figure 7:
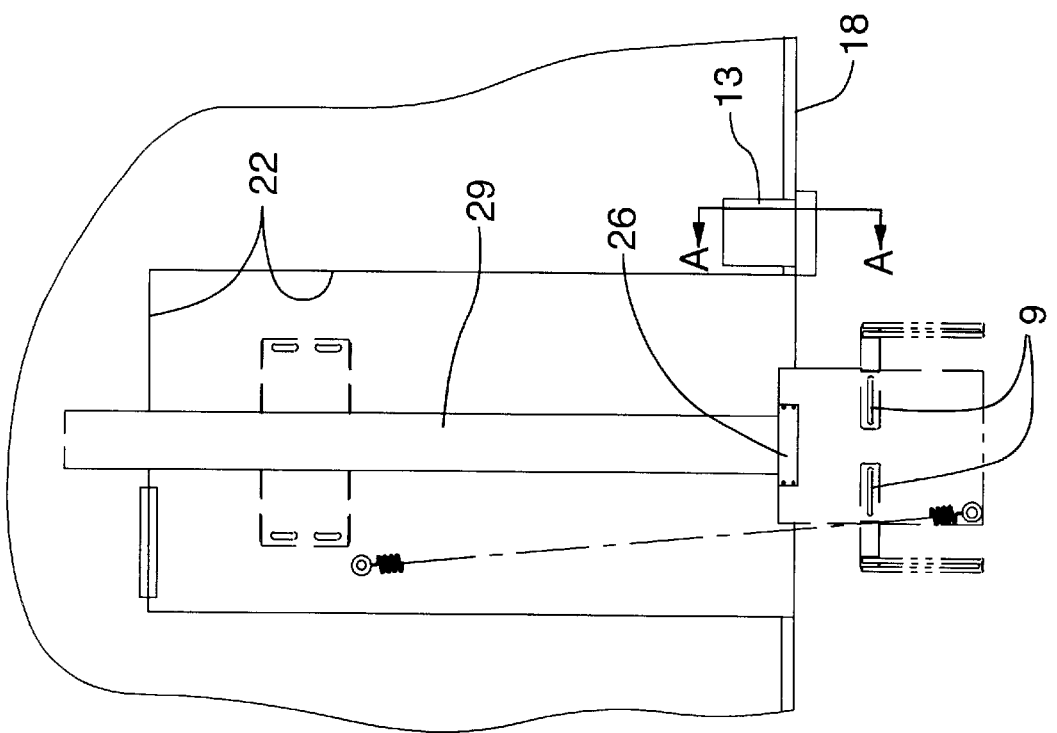
FIG. 7 is a side view of the carrier of the bin lifting means of the mobile shredding system of FIG. 1.
Figure 9:
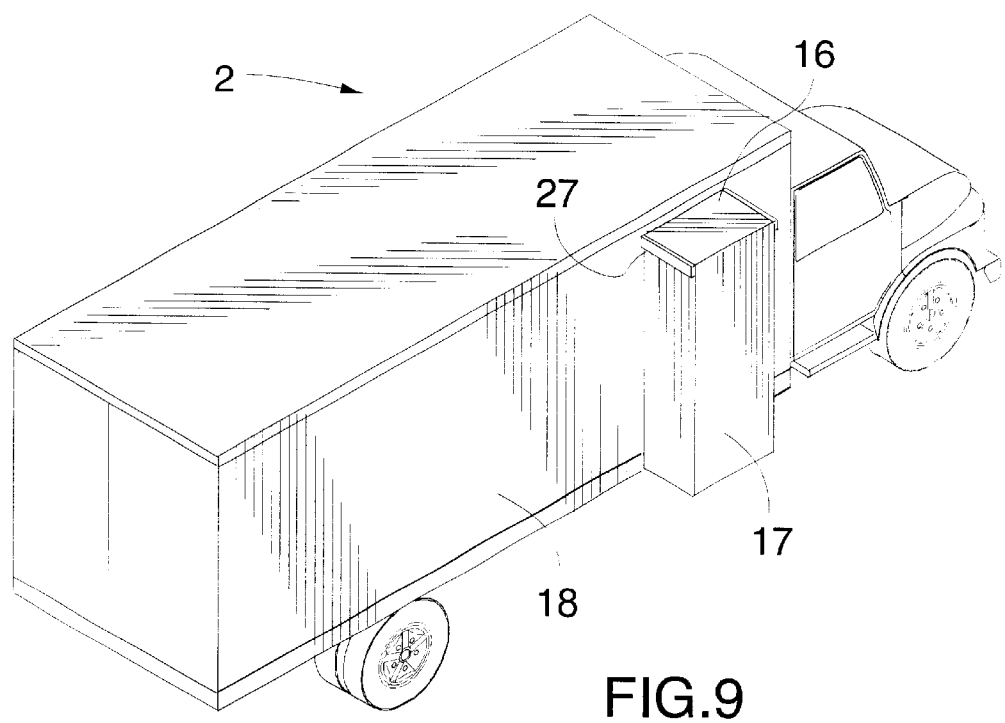
Fig. 9 is a view of the mobile shredding system showing the enclosure extended in the operating position.
Figure 10:
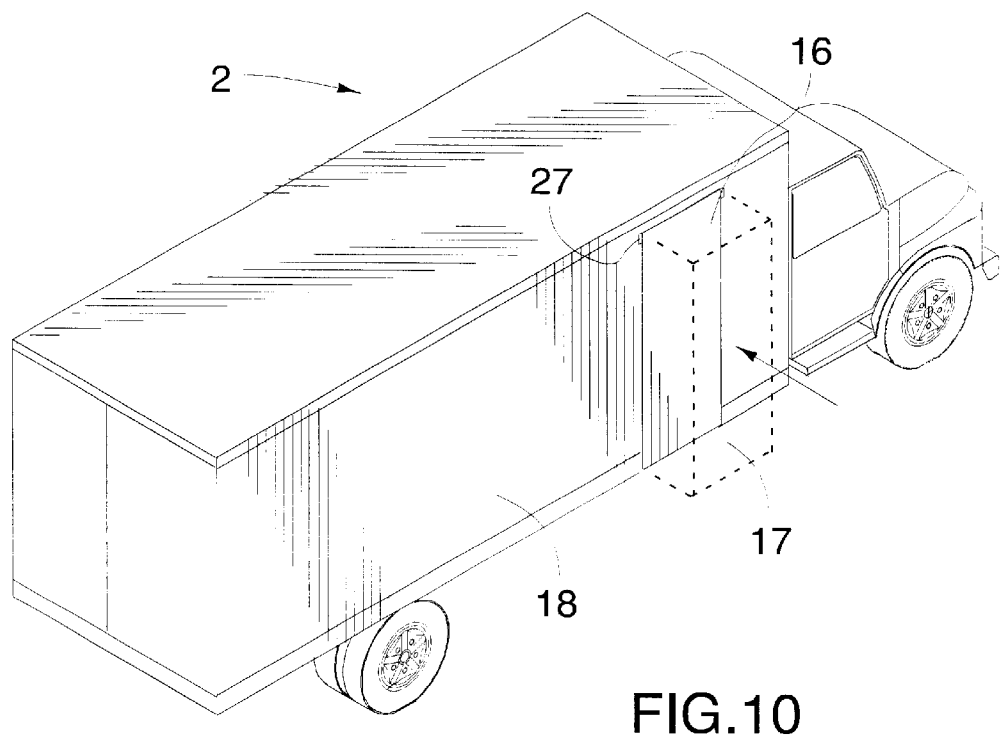
Fig. 10 is a view of the mobile shredding system showing the enclosure sliding on runners towards a stored position.

The weight measuring means preferably has a load cell 26, which physically replaces the chain adapter as supplied on a standard commercial bin dumper (as shown in FIG. 7). The chain adapter is the only link between the chain 7 and the carriage 8. Advantageously, the weight measuring means 13 further has a weight indicating means 14, for displaying the measured weight of the bin. The indicating means is preferably a digital readout, showing the weight in a desired unit (lbs. or kg, for example), or alternatively an analog readout, i.e. a scale with a needle. A printer 28 is advantageously arranged in a location convenient for the shredder operator, for example adjacent the weight indicating means (see FIG. 8). The printer is used to provide a hard-copy print-out of measured bin weight(s).

Preferably, the weight measuring means further has a weight value storing means 15, for storing the measured bin weight electronically. The weight value storing means is preferably a micro-computer with the associated I/O circuitry and memory means. The operator of the shredding system 1 has the option of accessing the stored weight values either individually, for billing per shredded bin, or as an accumulated sum of a certain number of bin weights, for billing one customer for a number of shredded material bins. The accessed information can be viewed on the weight indication means or printed on the printer.

The load cell 26 is thus electrically connected to the weight measuring means 13, which provides the weight indicating means 14 and the weight value storing means 15 with the appropriate signals for display and storage, respectively.

The system further preferably has an enclosure 16 arranged on a side of the vehicle, the enclosure generally covering the bin lifting means 6 and the bin 10 during lifting and emptying of the bin. The enclosure is preferably a three sided enclosure which is slidably arranged in the vehicle between a stored position, in which an outer wall 17 of the enclosure is generally flush with an outer side 18 of the vehicle, and an operating position, in which the enclosure is pulled out from the outer side of the vehicle. The enclosure fits inside a well 22 of the vehicle body. The enclosure advantageously slides on runners 27 attached to the well, and is preferably provided with locking means 19 for locking the enclosure in the stored position and the operating position. The locking means is preferably hydraulically or pneumatically operated via at least one cylinder 20.

The bin lifting means 6 is attached to the vehicle 2 via a mounting bracket 29 securely arranged inside the well 22.

The enclosure 16 covers the bin lifting means 6 for safety and security reasons. The enclosure prevents un-shredded paper from being exposed to the wind and prevents the operator from being caught by the bin during raising or lowering of the same. Typically, the enclosure is a three sided aluminium enclosure that pulls out 26½" from the side of the vehicle body. The actual size of the enclosure is determined by the bin size and the size of the bin lifting means. The enclosure is preferably mounted on four runners, for providing the required stability to the enclosure, during movement between the stored position and the operating position or when the enclosure is in the operating position. The enclosure is preferably held in position by small air cylinders that operate off the chassis air system. When the enclosure is pulled out, the bin is rolled inside the enclosure and carried up by the bin lifting means 6. When the enclosure is pushed in, the vehicle is of legal width and can travel on any North American road or Highway.

The bin lifting means 6 advantageously comprises a hydraulic drive 21 for powering the chain 7. For example, the hydraulic drive is advantageously a large displacement hydraulic drive. The hydraulic drive further advantageously drives the chain via at least one sprocket wheel 23.

Preferably, the bin lifting means 6 further comprises a height adjustable frame 24 to facilitate the installation and positioning of the frame on the vehicle.

The chain 7 thus lifts and lowers the carriage 8, preferably on rollers 25, up over an arc to provide the lifting and dumping action for the bin 10.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. A shredding system, comprising:

a vehicle having hopper, for receiving material to be shredded, a shredder communicating with said hopper, and a holding space for shredded waste into which said shredder feeds shredded material;

a bin lifting mean having at least one chain onto which is attached a carriage, said carriage having engagement means for attaching a bin, said at least one chain being movable by means of a drive mechanism from a lowered position, in which said carriage is adjacent the ground on which said vehicle is standing, and a raised position, in which said carriage is adjacent an inlet of said hopper and in which said bin is tipped so that the contents of said bin are emptied into said hopper via said inlet;

a movable enclosure arranged on said vehicle, movable between a retracted position adjacent said bin lifting means and an extended position away from said bin lifting means, said enclosure defining a generally vertical tunnel to accommodate transport of said bin by said bin lifting means during lifting and emptying of said bin; and weight measuring means incorporated into said carriage, arranged to measure the weight of said bin when said bin is lifted by said engagement means.

2. A shredding system as recited in claim 1, where said weight measuring means further has a weight indicating means, for displaying the measured weight of said bin.

3. A shredding system as recited in claim 1, where said weight measuring means further has a weight value storing means, for storing the measured bin weight electronically.

4. A shredding system as recited in claim 2, where said weight measuring means further has a weight value storing means, for storing the measured bin weight electronically.

5. A shredding system as recited in claim 1, where said bin lifting means is mounted on said vehicle via an adjustable frame, whereby said bin lifting means is adjustable in height relative to said vehicle.

6. A shredding system as recited in claim 1, wherein said movable enclosure is on a side of said vehicle.

7. A shredding system as recited in claim 1, wherein an outer wall of said enclosure is generally flush with an outer side of said vehicle, when in said retracted position.

8. A shredding system as recited in claim 1, wherein said weight measuring means comprises a load cell mounted between said engagement means and said frame.

* * * * *